United States Patent [19]

Van Camp

[11] 4,299,096
[45] Nov. 10, 1981

[54] DEVICE FOR OVERRIDING A TIME SWITCH OF AN AIR CONDITIONING SYSTEM

[76] Inventor: James G. Van Camp, 3161 E. Tenaya, Fresno, Calif. 93710

[21] Appl. No.: 208,930

[22] Filed: Nov. 21, 1980

[51] Int. Cl.³ .......................... F25B 29/00; F23N 5/20
[52] U.S. Cl. ..................................... 62/180; 165/26; 236/46 R
[58] Field of Search ...................... 62/180; 165/12, 26; 236/46 R, 47; 337/302, 303

[56] References Cited

U.S. PATENT DOCUMENTS 3,306,348 2/1967 Tucker .................................. 165/12
3,860,910 1/1975 Hudson .......................... 340/147 R
3,979,060 9/1976 Tierce .............................. 236/46 R Primary Examiner—William E. Wayner
Attorney, Agent, or Firm—Huebner & Worrel

[57] ABSTRACT

A device for overriding a time switch of an air conditioning system having an air conditioner unit and a thermostat remote from the unit, the thermostat controlling the unit through conductors extended from the unit and having a switch for selection of a mode of operation of the unit; the time swtich being intended to inhibit operation of the unit to conserve energy at times when such operation is not usually desired; and the device being disposed at the unit and signaled through the conductors by manipulation of the thermostat switch to override the time switch for a predetermined period of time.

8 Claims, 4 Drawing Figures

DEVICE FOR OVERRIDING A TIME SWITCH OF AN AIR CONDITIONING SYSTEM

BACKGROUND OF THE INVENTION

1. Field of the Invention

The present invention relates to a device for overriding a time switch in a control circuit for an air conditioning system, and more particularly to such a device connected between an air conditioner unit and a thermostat control unit remote therefrom for overriding a timing switch adapted to inhibit operations of the unit at predetermined intervals, the device being actuatable from the thermostat without requiring the addition of a switch at the thermostat or additional wiring to the thermostat.

2. Description of the Prior Art

It is well known to provide air conditioning systems with a control circuit having a timing switch, hereinafter referred to as a time switch, adapted to inhibit operation of the system at predetermined hours. Such a system is typically utilized in an office building to interrupt and inhibit the operation of an air conditioner unit outside of the usual office hours, for example, between 5:30 p.m. and 7:30 a.m. and on Saturdays and Sundays. Such systems result in the substantial savings in energy, since the buildings are not heated or cooled when substantially unoccupied.

However, personnel working outside of usual business hours frequently are subjected to uncomfortable temperature conditions during the periods when operation of the system is interrupted. Even though it would, of course, be possible to obtain relief by resetting the time switches, such switches usually are made relatively inaccessible in order to prevent unauthorized changing of established operational time periods. Further, the resetting of such switches often involves complex manipulations.

It is known to provide a conventional air conditioning system thermostat unit, located in an air conditioned space, with a manually actuatable overrride switch or the like, for initiating operation of a timer. The purpose of such a switch is to override the time switch for a predetermined period, typically an hour. A longer override period may be obtained, as desired, by subsequent actuation of the switch toward the end of each predetermined period.

Often, an override switch is convenient to operate from the air conditioned space and its use with a timer avoids having to reset the time clock. However, the addition or coupling of such a switch in a thermostat control circuit requires the installation of the circuit wiring between the thermostat and an associated air conditioner unit. Such involves procedures which are relatively time consuming and expensive to complete, particularly where a time clock is to be retrofitted in a building having an air conditioning system not originally provided with this energy saving feature.

It is, therefore, highly desirable to provide a selectively operable device adapted to override for a predetermined period a time switch for interrupting and inhibiting operation of an air conditioner unit at predetermined hours, the device being actuatable from an existing thermostat remotely related to the unit, without modification of the thermostat and without requiring that additional wiring be strung between the thermostat and the unit.

OBJECTS AND SUMMARY OF THE INVENTION

Accordingly, it is an object of the instant invention to provide an improved device for overriding a time switch in a control circuit for an air conditioning system.

Another object is to provide such a time switch override for controlling systems such as an air conditioner unit from a remotely related system-control thermostat.

Another object is to provide a time switch override device, the operation of which is controlled from a conventional thermostat disposed in a space cooled by an air conditioning system; the operation and the override device being initiated through a manipulation of switching elements normally provided for controlling the operation of the thermostat.

These and other objects and advantages are obtained by a device having control circuitry for overriding the time switch normally provided in an air conditioning system, said device being mounted at the air conditioner unit and being adapted for connection within the existing control circuit, and further adapted to utilize a predetermined change in the state of energization of the control circuit as a signal requiring that the time switch be overriden for a predetermined period.

DESCRIPTION OF THE PREFERRED EMBODIMENT

Figure 1:
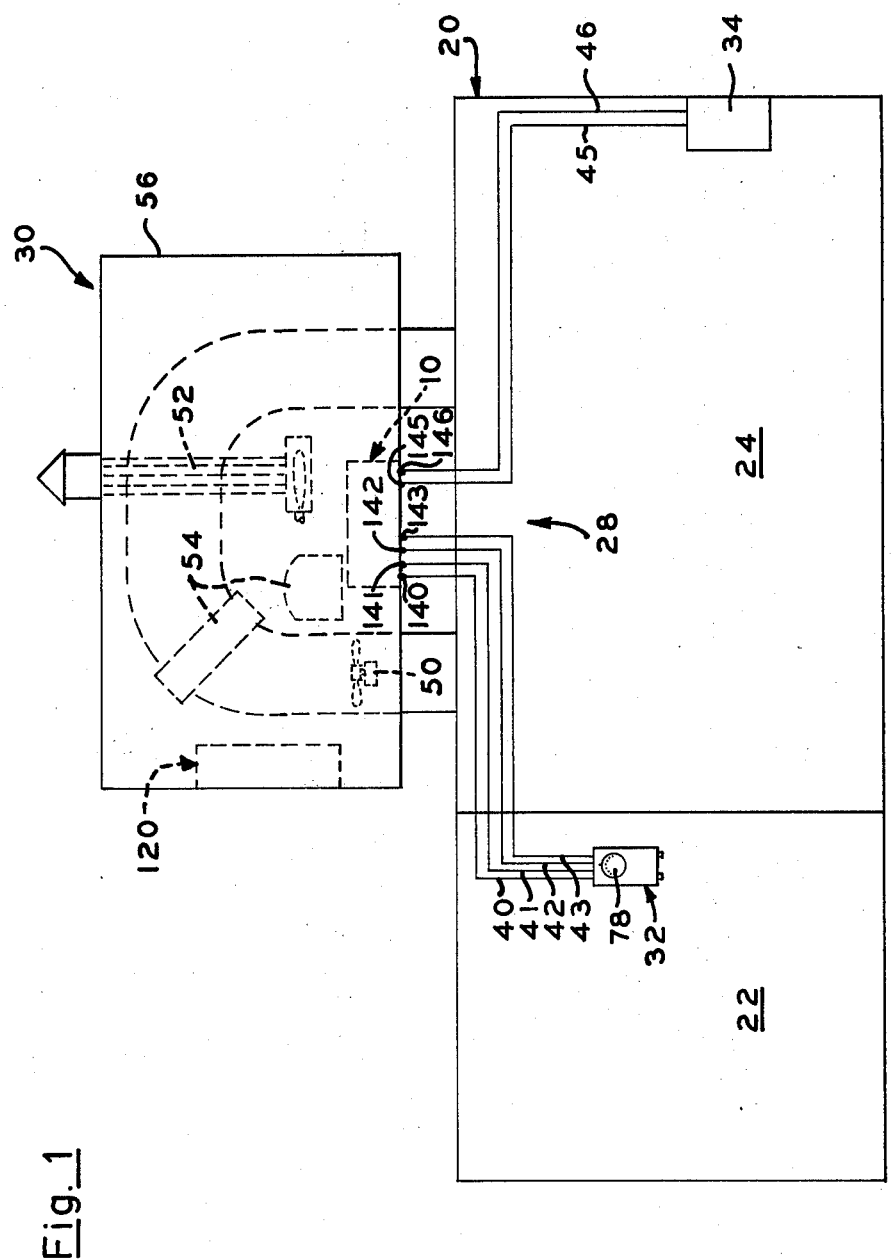
FIG. 1 is a schematic vertical section of a building and an air conditioning system, not to scale, provided with a device embodying the principles of the present invention adapted to override the time switch of the system.

Referring with greater particularity to the drawings, a device 10 embodying the principles of the present invention is depicted in FIG. 1.

The device 10 is shown in a representative operating environment such as, for example, a building 20 having a first room 22 and a second room 24. The rooms 22 and 24 are air conditioned or cooled by an air conditioning system, indicated generally by the numeral 28.

Digressing at this juncture, it is important to note that while the device 10 is intended primarily for use in controlling the operation of cooling or air conditioning systems, it may be utilized in the control of heating systems as well, particularly in those instances where the heating and cooling systems are combined. The physical relationship of the system and the device with a building is, for the sake of simplicity, schematically illustrated in FIG. 1.

The details of the device 10 and the system 28, including the electrical circuits utilized subsequently will be explained. As previously inferred, the term "air conditioning" and all related terms refer to the heating or cooling of the interior of a building and the system 28 is, typically, of well-known design and will be described herein only to the extent necessary for providing for a complete understanding of the device 10.

Continuing now with the description of the physical relationship or arrangement of the building 20 and system 28, it can be seen that the system 28 includes an air conditioning unit 30, FIG. 1, which is mounted on the roof of the building 20, above the room 24. The device 10 is, typically, mounted on the unit 30. The system 28 also includes a thermostat 32 mounted remotely from the unit 10, preferably on a wall of the room 22, and a time switch 34 mounted on a wall of the other room. The structure and operation of these elements will be described subsequently in greater detail; however, it may be noted that the thermostat 32 provides for a manual control of the system 28 while the time switch 34 is provided to override the thermostat and prevent operation of the system at those times in which air conditioning usually is not required. The thermostat 32 is, therefore, located in the room 22 for access by an occupant thereof and is subject to ambient temperature while the time switch 34 is located in the room 24 in order to reduce any opportunity to tamper with its time setting.

The circuit for the system 28 also is provided with a plurality of electrical leads, herein referred to as a heating conductor 40, a cooling conductor 41, a fan conductor 42, and a power conductor 43. These leads serve to interconnect the device 10 and the thermostat 32. The system 28 is provided with still another lead, herein referred to as a power conductor 45, and still another lead comprising a common conductor 46 which serve to interconnect the device 10 and the time switch 34.

The electrical connections of each of the six conductors will subsequently be described. Typically, these conductors are found in conventional air conditioning systems which include a time switch but do not include an override device, such as the device 10, for overriding the time switch. In those systems not equipped with such a device, the six conductors are connected directly to the unit 30. The conductors 40 through 43 normally are required in providing for control of the associated air conditioning unit in an existing air conditioning system which has neither an override device or a time switch, while the conductors 45 and 46 are present in air conditioning systems employing a time switch, whether or not the system is provided with an override device.

It is thus apparent that retrofitting an air conditioning system with the device 10 of the instant invention does not require installation of any additional electrical leads or conductors from either the thermostat 32 or from the time switch 34, provided such exists, to the unit 30.

While the unit 30 is of well-known construction as is schematically represented in FIG. 1, it is to be understood that the unit includes a fan or apparatus 50 for circulating air to be cooled as well as an air conditioning apparatus consisting of a heating apparatus 52 and a cooling apparatus 54. All of these apparatus are disposed within a common enclosure 56. The fan apparatus, the heating apparatus, and the cooling apparatus are individually and selectively brought into operation by electrical signals delivered by control circuits subsequently to be described, so that the unit and, therefore, the system 28, provides for a plurality of modes of operation, depending on whether the building 20 is to be heated, cooled, or merely having the air therein circulated by the fan apparatus.

Figures 2, 3A:
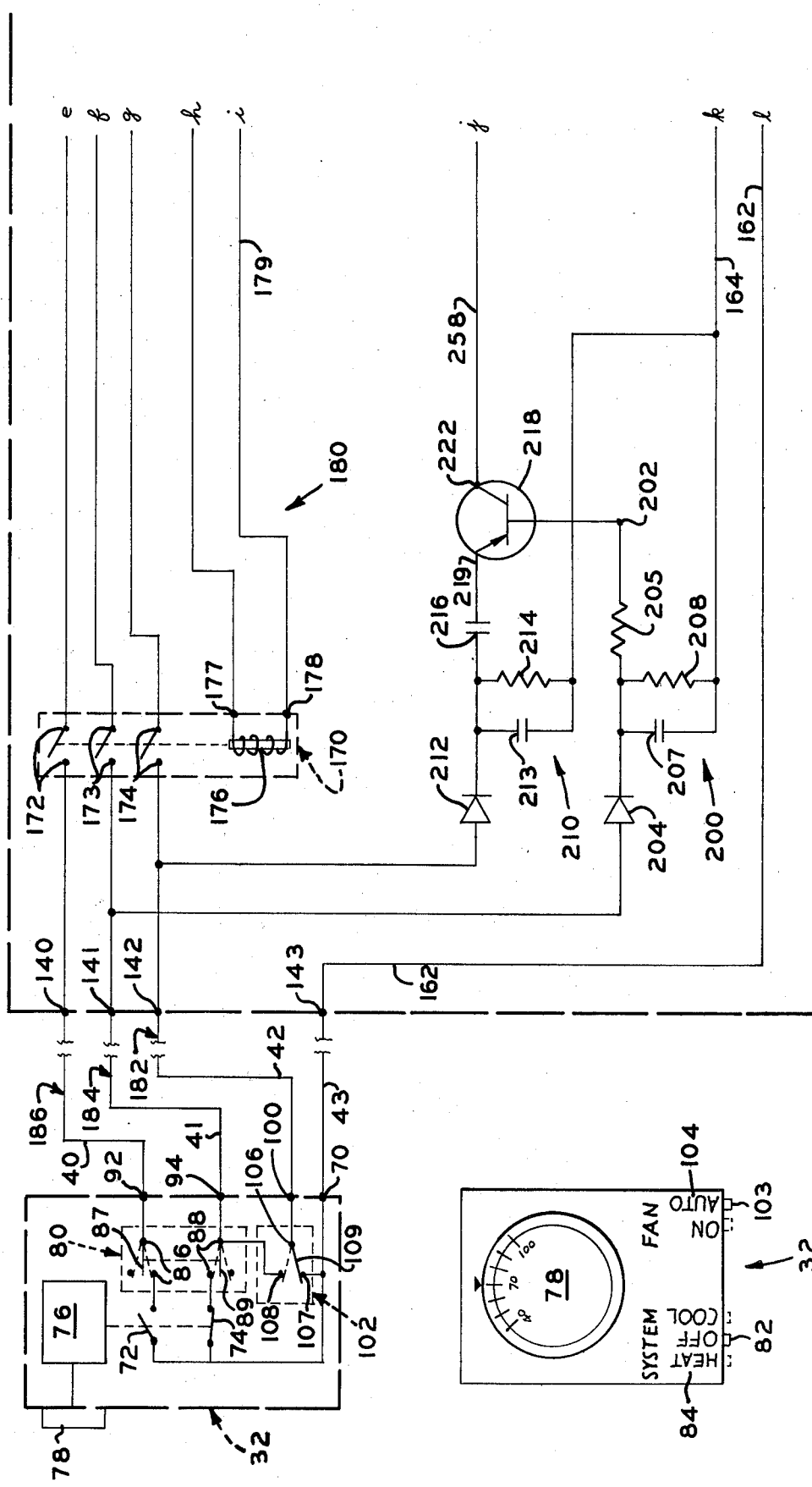
FIG. 2 is an elevation of the exterior of a conventional thermostat adapted to be utilized with the system of FIG. 1.
FIGS. 3A and 3B comprise a composite electrical diagram of a circuit for the device end of portions of the air conditioning system depicted in FIG. 1.
Figure 3B:
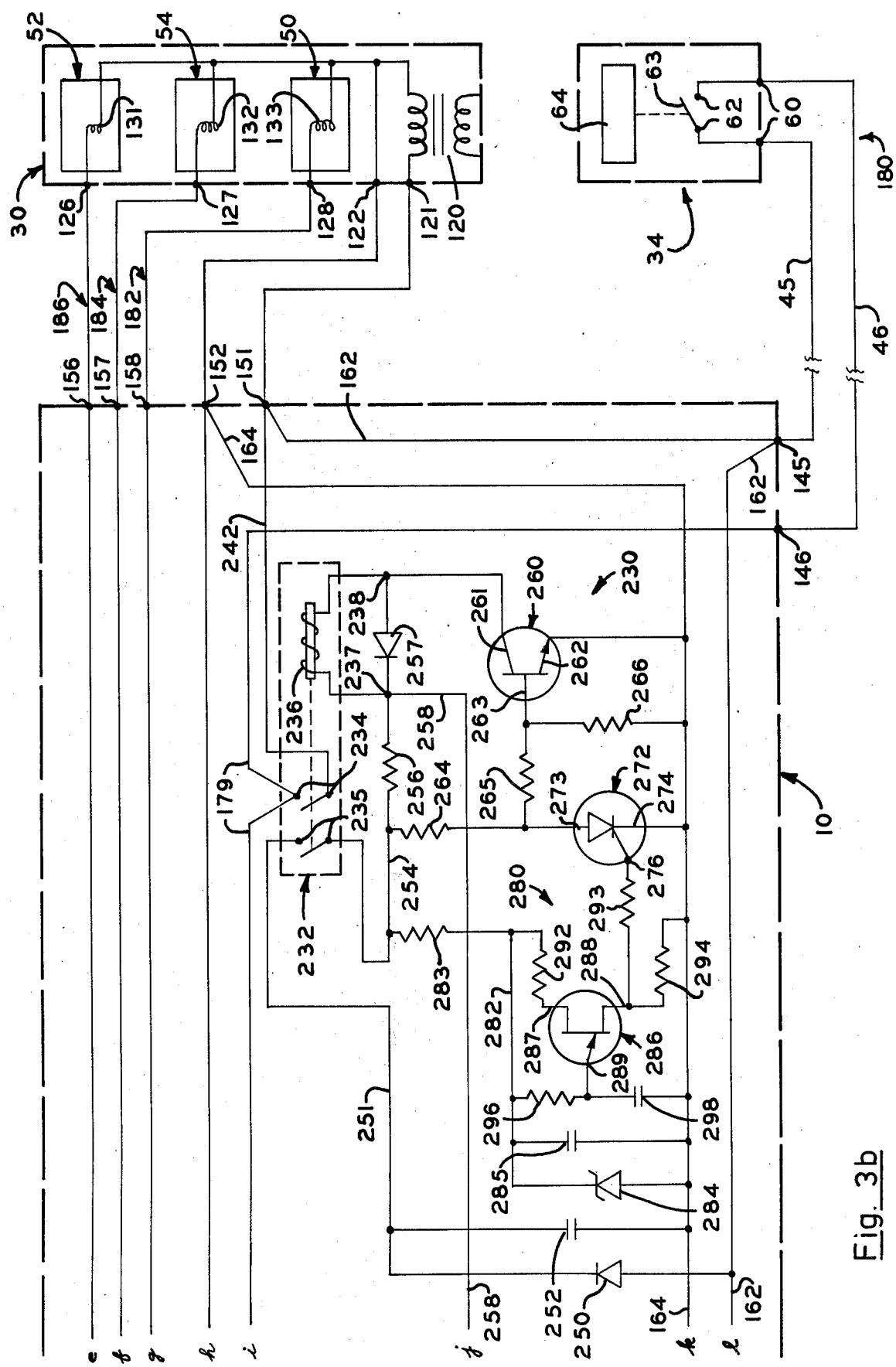

The time switch 34 is also of well-known construction, and the details of the circuit relevant to the instant invention are shown diagrammatically in FIG. 3B. This switch has a pair of external terminals 60, FIG. 3B, and a pair of internal contacts 62 connected in series with the terminals 60. The contacts are adapted to be opened and closed by a shorting or bridging bar 63 at predetermined times, preferably by a clock 64 provided for controlling the time switch 34 and connected in a suitable manner to the bridging bar 63. The switch thus has an open position in which the terminals 60 are not connected through the switch and a closed position wherein the contacts 62 are connected through the bar 63. The clock 64 is adapted to actuate the bar 63 so as to open the contacts 62 at predetermined times, such as after normal working hours or on weekends when operation of the unit 30 usually is not desired, and to close the contacts at other predetermined times when such operation is desired.

The details of the thermostat 32 are best shown in FIGS. 2 and 3A. The thermostat 32 has a power terminal 70, FIG. 3A, a temperature-actuated heating switch 72, and a temperature-actuated cooling switch 74. The switches are connected in parallel to the power terminal and are actuated together by a temperature sensor 76, the heating switch being closed when the cooling switch is open. A reversed configuration is achievable. This sensor is provided with a knob 78, best shown in FIG. 2, typically accessible exteriorly of the thermostat 32, for setting the thermostat to a predetermined ambient temperature which it is desired to have the system 28 maintain. The predetermined temperature if, approximately, a temperature at which operation of the unit 30 is desired, the heating switch closing as the ambient temperature falls, the cooling switch closing as the ambient temperature rises. The predetermined temperature also is approximately the temperature at which such operation is desired to terminate, the heating switch opening on rising temperature and the cooling switch opening on falling temperature.

The thermostat 32 is provided with a manually actuated system mode select switch 80, FIG. 3A, having a toggle 82, shown in FIG. 2, accessible externally of the thermostat and disposed adjacent to indicia 84 denoting whether the system 28 is to operate in a "heating", "cooling", or "off" mode. Electrically, as shown in FIG. 3A, this switch is of double-pole, double-throw, center-off configuration having a pair of heating contacts 86 which are closed by a bar 87 to define the "heating" mode for the system and a pair of cooling contacts 88 which are closed by a bar 89 to define the "cooling" mode for the system. Both pairs of contacts are open in the center-off condition so that the system is thus in its "off" mode.

The thermostat 32 also is provided with a pair of output terminals, a heating terminal 92 and a cooling terminal 94. The heating contacts 86 are connected in series between the heating switch 72 and the heating terminal 92 and the cooling contacts 88 are connected in series between the cooling switch 74 and the cooling terminal 94. The mode select switch 80 thus is connected in series with the temperature-actuated switches 72 and 74 connected between the power terminal 70 and the output terminals 92 and 94. The select switch 80 is adapted to be configured in a first condition, the "center-off" condition, wherein neither output terminal is energizable from the power terminal 70, although the corresponding temperature-actuated switch 72 or 74 is closed. The heating terminal 92 and the cooling terminal 94 are, therefore, always de-energized in the position for the switch 80.

The mode select switch 80 also is adapted to be configured to assume a second condition wherein the cooling terminal 94 is energizable from the power terminal through this switch when the cooling switch 74 is closed, and configured to assume a third condition wherein the heating terminal 90 is energizable from the power terminal 70 through the mode select switch 80 when the heating switch 72 is closed.

The thermostat 32 also is provided with a fan terminal 100 and a fan switch, also referred to as a fan mode select switch, 102. This switch is a manually actuatable, single-pole, double-throw switch equipped with a toggle 103, shown in FIG. 2, accessible from the exterior of the thermostat 32 and disposed adjacent to indicia 104 denoting operational modes for the fan apparatus 50.

Electrically, as shown in FIG. 3A, the switch 102 has a center terminal or contact 106 connected to the fan terminal 100, a first terminal or contact 107 connected to the power terminal 70, a second terminal or contact 108 connected to the cooling terminal 94, and a pivotal bridging bar 109 connected to the terminal 106. The switch 102 has a first position wherein a circuit is completed between terminals 106 and 107. In this position, the fan terminal 100 is connected through the center terminal 106 of the switch to provide a direct connection between the power terminal 70 and the fan terminal 100. Thus, the fan terminal 100 is energized by the power terminal 70 when the switch 102 is in its "on" mode position.

The switch 102 has a second position, wherein the center terminal 106 is connected to the power terminal 70 through the cooling switch 74 and the contacts 88 of the system mode select switch 80 in response to a pivoting of the bridging bar 109 into contact with the terminal 108, as shown in dotted lines. The direct connection established between the terminals 100 and 70, in the first position of the switch 102, is thus interrupted when the switch is in its second position. In the second position, therefore, the fan terminal 100 is de-energized when the cooling switch 74 is open, when the switch 80 is in its first or center-off condition, or when the switch 80 is in its third condition wherein the heating terminal 92 is energizable from the power terminal 70. Thus, the fan terminal 100 serves as an output terminal of the thermostat 32.

The fan switch is manually actuatable to select a predetermined one of two modes of the operation for the fan apparatus 50, namely an "on" mode and an "auto" mode. In its on mode, the fan apparatus operates continually, while in its auto mode, the fan apparatus only operates when the cooling apparatus 54 is operating.

As shown in FIG. 3B, the unit 30 includes a control voltage source or transformer 120, a live terminal 121, and a common terminal 122, the transformer being connected between these last-mentioned terminals. The transformer 120 is energized from any suitable electrical power supply which, typically, also powers the fan apparatus 50, the heating apparatus 52, and the cooling apparatus 54.

The unit 30 is provided with a heating terminal, also referred to as a heating apparatus terminal 126, a cooling terminal, also referred to as a cooling apparatus terminal 127, and a fan terminal also referred to as a fan apparatus terminal 128. The unit 30 further includes a heating relay coil 131, a cooling relay coil 132, and a fan relay coil 133 which are, respectively, elements of the heating apparatus, the cooling apparatus, and the fan apparatus. The aforementioned coils are individually connected between the common terminal 122 and each of the corresponding terminals 126, 127, and 128. When each coil 131, 132, or 133 is energized, from the live terminal 121 through the corresponding terminal 126, 127, or 128 of the unit 30, the corresponding apparatus 50, 52, or 54 is, of course, caused to operate.

The device 10 typically is mounted within the enclosure 56, as shown in FIG. 1, for convenience in connecting the device to the conductors 40, 41, 42, 43, 45, and 46. As shown in FIGS. 3A and 3B, the device is provided with terminals 140, 141, 142, and 143, FIG. 3A, and with terminals 145 and 146, FIG. 3B, corresponding to these conductors, the conductors being individually connected to these terminals at the device 10.

At the thermostat 32, the heating conductor 40, FIG. 3A, is connected to the heating terminal 92; the cooling conductor 41 is connected to the cooling terminal 94; and the power conductor 43 is connected to the power terminal 70. At the time switch 34, FIG. 3B, the conductor 45 is connected to one of the terminals 60, while the conductor 46 is connected to the other of the terminals 60. Within the enclosure 56, the device 10 has a terminal 151 and a terminal 152 connected, respectively, to the live terminal 121 and to the common terminal 122 and has terminals 156, 157, and 158 connected, respectively, to the terminals 126, 127, and 128 of the unit 30.

Referring to FIG. 1, wherein the physical relation of the device 10 to the apparatus 50, 52, and 54 and to the conductors 40, 41, 42, 43, 45, and 46 is shown, and referring to FIGS. 3A and 3B, wherein the electrical connections of the device to these conductors and to the apparatus are shown, it is seen that there is a one-to-one correspondence, respectively, between the terminals 140, 141, 142, and 143 of the device 10 and the terminals 126, 127, 128, and 121 of the unit 30. As a result, retrofitting an existing air conditioning system 28 with the device 10 requires that the conductors 40 through 43 be disturbed only at the unit 30, FIG. 1. The extent to which the conductors are disturbed is only that required to disconnect the conductors from the terminals 126, 127, 128, and 121 and reconnect the conductors to the terminals 140, 141, 142, and 143.

In a system 28 provided with a time switch 34, FIGS. 1 and 3B, prior to retrofitting a device 10 to the system, one of the conductors 45 or 46 is physically connected to the live terminal 121 and the other of these conductors is physically connected to the conductor 43 at the unit 30. The switch 34 thus opens and closes electrical connection between the live terminal 121 and the power terminal 70, FIG. 3A, respectively, to inhibit and to permit operation of the unit 30. With the switch 34 physically connected in this manner, it is apparent that retrofitting an existing system 28 having a time switch, such as the switch 34, with a device 10, FIG. 1, of the instant invention does not require disturbing the conductors 45 and 46, except at the device 10 in order to connect these conductors, respectively, to the terminals 145 and 146.

It is thus apparent that the entire installation of a device 10 in an existing air conditioning system 28 can be performed at the unit 30 simply by mounting the device in the enclosure 56 in any suitable manner, then connecting the conductors 40, 41, 42, 43, 45, and 46 within the enclosure to the corresponding terminals of the device 10, and finally by providing relatively short conductors within the enclosure, as may be visualized from FIG. 3B, from the terminals 151, 152, 156, 157, and 158 to, respectively, the terminals 121, 122, 126, 127, and 128.

It is here particularly important to fully appreciate that the device 10 is representative of a class of similar devices which can be employed to override the time switch 34. The device 10, as shown, currently is employed for this purpose; however it is to be fully understood that the details of the device 10 form no part of the claimed invention. Therefore, in the interest of brevity, only so much of the device is shown and described as is deemed necessary to provide for a complete understanding of the invention.

The device 10 has a conductor 162 connecting its terminals 143, FIG. 3A, and its terminals 145 and 151, FIG. 3B. Thus the power terminal 70 of the thermostat 32 is energized by the transformer 120 through the live terminal 121 and the conductor 162, while the power terminal is connected to the transformer 120 through the power conductor 43 and the conductor 162. The device also includes a common lead, herein referred to as a bus 164, FIGS. 3A and 3B, extended from the terminal 152 which is connected, in turn, to the common terminal 122 of the unit 30 and thus to the transformer 120.

As shown, the device 10 includes an output relay 170, FIG. 3A, having three pairs of single-throw, normally open contacts 172, 173, and 174 and having a relay coil 176. The coil 176 is provided with opposite terminals 177 and 178 and is adapted to close the contacts 172, 173, and 174 when energized. However, a relay having a larger number of poles and of a double-throw configuration could, of course, be utilized in place of the output relay 170. This can be achieved simply by not utilizing redundant pairs of contacts and by individually bypassing other pairs of contacts with jumpers. The contacts 172 are connected between the terminals 140 and 156 of the device; the contacts 173 are connected between the terminals 141 and 157; and the contacts 174 are connected between its terminals 142 and 158. The terminal 177 of the coil 176 is connected directly to the terminal 152, and the terminal 178 is connected to the terminal 146 by a conductor 179.

The terminals and connections described in the two preceding paragraphs, together with previously described elements depicted in FIGS. 3A and 3B, define electrical circuits, which, for the sake of simplicity, are herein identified as a timing circuit 180, a first or fan circuit which for the sake of convenience is designated 182, a cooling circuit 184, and a heating circuit 186. All of the circuits 180 through 186 are connected between the live terminal 121 and the common terminal 122 for energization by the transformer 120.

It is seen that the coil 176, with its terminals 177 and 178, is included in the timing circuit 180, which also includes the live terminal 121, the terminal 151, the terminal 145 connected to the conductor 45, the contacts 62 of the time switch 34, the conductor 46 connected to the terminal 146, the conductor 179, the coil 176, the terminal 152, and the common terminal 122. The coil 176 is, therefore, energized by the transformer 120 whenever the time switch contacts 62 are closed by the bar 63 at the predetermined times established by the clock 64. At such times, the energized relay 170 closes its contacts 172, 173, and 174, and the air conditioning system 28 functions identically to an air conditioning system having neither a time switch, which is similar to the switch 34, nor a device to override such a switch. However, when the contacts 62 of the time switch are opened by the clock, at times when operation of the system is usually not desired, the timing circuit 180 is open and the coil 176 is de-energized unless, of course, the time switch is overridden by the device 10 in a manner subsequently to be described. When not so overridden, the system 28 functions simply as an air conditioning system having a time switch, absent a device to override the time switch.

The device 10 and the system 28 collectively define the fan circuit 182. The circuit 182 is deemed to include the live terminal 121, the terminal 151, the conductor 162, the terminal 143, the conductor 43, and the power terminal 70 of the thermostat. This circuit continues with a series connection through the terminal 107, bar 109, and terminal 106 of the fan mode switch 102. The circuit 182 also is deemed to include the terminal 100, the fan conductor 42, the terminal 142, the contacts 174 of the control relay 170, and the terminals 158 and 128. The circuit 182 now extends through the fan relay coil 133 to the transformer 120.

Therefore, the fan terminal 100 of the thermostat 32, FIG. 3A, is energized through the fan circuit 182 when the bar 109 engages the contact 107 in the first position of the fan mode switch 102. However, the fan terminal 100 is de-energized when the bar 109 engages the contact 108 and when the select switch 80 is in either its first condition or its third condition. It is important to note that the fan terminal 100 is de-energizable, that is to say may be de-energized, when the fan mode switch 102 is in its second position. It should be apparent that the fan conductor 42 connects the fan terminal 100, FIG. 3A, of the thermostat 32 to the fan terminal 128, FIG. 3B, of the unit 30, through the relay 170. Thus the terminal 128 is in a de-energized state when the terminal 100 is de-energized and the terminal 128 is energizable through the conductor 42, to an energized state, when the terminal 100 is energized. The state of energization of both terminals 100 and 128 is the same when the contacts 174, FIG. 3A, of the relay 170 are closed. It is to be understood that, as long as the contacts 174 are closed, the fan circuit 182 provides for operation of the unit 30 in a mode of operation in which the fan apparatus 50 operates continuously. This mode is selected simply by positioning the fan mode switch 102 in its first position to energize the terminal 128 of the unit 30.

The cooling circuit 184 includes the elements, FIGS. 3A and 3B, of the fan circuit 182 which serve to connect the live terminal 121 through the conductors 43 and 162 of the device 10 to the power terminal 70 of the thermostat 32. From the power terminal 70, the cooling circuit extends, independently of the circuits 182 and 186, through the cooling switch 74 and the contacts 88 of the system mode select switch 80 to the thermostat cooling terminal 94. From the terminal 94, the cooling circuit continues through the cooling conductor 41, the terminal 141 of the device, the contacts 173 of the relay 170, the terminals 157 and 127, and the cooling relay coil 132 to the transformer 120.

When the cooling circuit 184 is completed so as to energize the relay coil 132, FIG. 3B, and operate the cooling apparatus 54, the unit 30 is in a cooling mode. Since the contacts 88, FIG. 3A, of the system mode select switch 80 are in series in the cooling circuit with the temperature-actuated cooling switch 74, operation of the unit 30 in the cooling mode is inhibited when the contacts 88 are not connected by the bar 109 although the cooling switch 74 is closed. It is apparent that the contacts 173 of the output relay 170 open to interrupt the cooling circuit 184 and close to complete this circuit. It is also apparent that the output relay contacts 173 function, together with the relay coil 176 and the conductors 45 and 46 and time switch 34, shown in FIG. 3B, to interrupt the cooling circuit 184 and that these elements function to complete this circuit at predetermined times established by the clock 64 when all of the other contacts in the cooling circuit are closed.

It also should be apparent that operation of the unit 30, FIG. 3B, in its cooling mode is inhibited when the contacts 173, FIG. 3A, are open although the cooling switch 74 is closed. In the cooling circuit 184, the cooling conductor 41 serves to connect the terminal 94 of the thermostat 32 to the terminal 127 of the unit 30. As a result, the terminal 127 is de-energized when the terminal 94 is de-energized, and the terminal 127 is energizable from the terminal 94 when the latter terminal is energized, such energization being possible only when the contacts 173 of the output relay 170 are closed.

As a result of the described connections of the output relay 170 in the timing circuit 180 and the cooling circuit 184, it can be seen that the output relay 170, FIG. 3A, is a switching element having its coil 176 connected between the live terminal 121, FIG. 3B, and the common terminal 122, through the switch 34, by the conductors 46 and 179. As a result, the coil 176 is energizable by the transformer 120, FIG. 3B, when the time switch terminals 60 are connected electrically, whether the electrical connection is internally of the switch 34 through its contacts 62 and bar 63 or is external to the switch 34, in a manner hereinafter to be described. Conversely, of course, the coil 176 is de-energized when the terminals 62 are not electrically connected through the bar 63.

It can also be seen that the cooling contacts 173 of the output relay 170 are connected in series with the cooling conductor 41 between the cooling terminal 94, FIG. 3A, of the thermostat 32 and the cooling terminal 127, FIG. 3B, of the unit 30. When the cooling contacts 173 close due to energization of the coil 176 by electrical connection of the terminals 60, the unit terminal 127 is energized from the thermostat terminal 94 so that the cooling apparatus 54 operates when the terminal 94 is energized. Conversely, when the cooling contacts 173 open due to de-energization of the coil 176, the terminal 127 is disconnected from the terminal 94 so that the terminal 127 is de-energized although the terminal 94 is energized.

The heating circuit 186 includes the elements, shown in FIGS. 3A and 3B, which are common to the fan circuit 182 and to the cooling circuit 184 and which serve to connect the live terminal 121 through the conductors 162 and 43 to the power terminal 70. From the power terminal 70, FIG. 3A, the heating circuit extends sequentially through the heating switch 72, the contacts 86 of the switch 80, the terminal 92, the conductor 40, the terminal 140, the contacts 172 of the relay 170, the terminal 156, the terminal 126, and the heating relay coil 131 of the heating apparatus 50 to the transformer 120. The heating circuit is thus only complete, with resulting operation of the heating apparatus 50, when the switch 72 is closed, when the bar 87 engages the contacts 86, and when the contacts 172 are closed due to energization of the relay coil 176.

The device 10 has a first sensor circuit which is shown in FIG. 3A and is indicated generally by the numeral 200. This sensor circuit provides a signal terminal 202. This circuit 200 also includes a diode 204 and a current limiting resistor 205 which are connected sequentially between the terminal 141 of the device and the signal terminal 202. The diode 204 is disposed between the resistor 205 and the terminal 141, and the diode is connected for positive current flow in a direction from the terminal 141 toward the resistor 205 and toward the terminal 202. The circuit 200 includes a capacitor 207 and a capacitor discharge resistor 208 connected in parallel to the common bus 164 from a point between the diode 204 and the resistor 205. The sensor circuit 200 is, therefore, connected to the common terminal 122 through the bus 164. When the thermostat cooling terminal 94 is energized with an alternating voltage from the transformer 120, this voltage is applied to the terminal 141 through the conductor 41 and is rectified by the diode 24 and filtered by the capacitor 207. When the terminal 94 is energized, a substantially steady voltage is thus provided through the resistor 205 to the signal terminal 202. However, when the thermostat cooling terminal 94 is de-energized, the capacitor 207 discharges through the discharge resistor 208. The signal terminal 202 is then substantially at the voltage of the common bus as a first or permissive signal within the device. This signal indicates that the thermostat cooling terminal 94 is de-energized, as is the case when the system mode select switch 80 is in its second condition wherein the bar 89 does not connect the contacts 88. The first sensor circuit 200, therefore, serves to detect that the switch 80 is in this second condition.

The device 10 has a second sensor circuit indicated generally by the numeral 210. The second sensor circuit has a diode 212, a filter capacitor 213, and a discharge resistor 214 connected relative to each other and to the common bus 164 in a manner substantially identical to the manner in which the diode 204, the capacitor 207, and the resistor 208 of the first sensor circuit 200 are connected. The diode 212 is connected to the terminal 142 opposite of the capacitor 213. From the terminal 142, the diode 212 is connected through the fan conductor 42 to the fan terminal 100 of the thermostat 32. As is apparent by examining FIGS. 1 and 3A, the second sensor circuit 210 is connected to the fan conductor 42 at a point on the conductor which is physically adjacent to the fan terminal 128 of the unit 30. The second sensor circuit includes a pulse-forming capacitor 216 and a PNP transistor having an emitter 219. One side of the capacitor 216 is connected to the diode 212 oppositely of the terminal 142, and the opposite side of the capacitor is connected to the emitter 219. The transistor 218 has a collector which provides a signal terminal 222 for the second sensor circuit 210, and the base of the transistor 218 is connected directly to the signal terminal 202 of the first sensor circuit 200.

When the fan terminal 100 of the thermostat 32 is de-energized, no voltage is provided through the fan conductor 42 to the terminal 142. The terminal 142 is thus de-energized so that the second sensor circuit 210 is de-energized and the signal terminal 222 is substantially at the voltage of the common bus 164. However, when the thermostat fan terminal 100 is energized with an alternating voltage from the transformer 120, this voltage is rectified by the diode 212 and filtered by the capacitor 213 so that the capacitor 216 charges. As this capacitor charges, a positive-going pulse occurs at the emitter 219 of the transistor 218 as a second or initiate signal within the device indicating that the thermostat fan terminal 100 has changed from its de-energized state to its energized state. Such a change of state occurs when two circumstances are present simultaneously. One circumstance is that the system mode switch 80 is not in its second condition, wherein the bar 89 closes the contacts 88, so that the terminal 108 is de-energized. The other circumstance occurs when the fan mode switch 102 is moved from its second position, wherein the bar 109 engages the contact 108, to its first position, wherein the bar 109 engages the contact 107. The terminal 100 is thereby brought to an energized state by electrical connection to the power terminal 70. Under these conditions, it is apparent that the second sensor circuit 210 serves to detect movement of the fan mode switch to its first position from its second position. If the permissive signal, the voltage of the common bus 164, is present at the signal terminal 202 of the circuit 200 when the pulse representing the initiate signal occurs at the emitter 219, the transistor 218 is turned on by this voltage and conducts the pulse to the signal terminal 222 of the second sensor circuit 210. However, if the permissive signal is not present, rectified voltage from the transformer 120 is present at the base of the transistor 218 and the transistor is turned off, blocking the pulse so that the initiate signal does not appear at the signal terminal 222.

The device 10 includes a switching circuit which is indicated generally by the numeral 230 and includes a relay 232 shown in FIG. 3B. This relay has a first pair 234 and a second pair 235 of normally open contacts. The relay 232 also has a coil 236 which is provided with opposite terminals 237 and 238 and is adapted to close the pairs of contacts when energized. One contact of the first pair 234 is connected in the conductor 179 and through this conductor to the terminal 178, FIG. 3A, of the relay coil 176 and to the terminal 146, FIG. 3B. The other contact of the first pair 234 is connected by a conductor 242 to the terminal 151, FIG. 3B, which is connected by the conductor 162 to the terminal 145. Since the terminals 145 and 146 are connected individually to the terminals 60 of the time switch 34 by the conductors 45 and 46, the first pair 234 of contacts are connected in parallel with the terminals 60 of the time switch 34. As a result, the terminals 60 are connected electrically through the first pair 234 of the contacts when this pair is closed, although the contacts 62 of the time switch 34 are opened by the clock 64.

The switching circuit 230 includes a rectifier diode 250 having one side connected by a conductor 251 to one of the second pair 235 of contacts of the relay 232. The other side of the diode 250 is connected to the conductor 162 which is, as previously described, connected to the live terminal 121. The diode is connected for positive current flow in a direction from the conductor 162 toward the pair 235 of contacts. The switching circuit 230 also includes a filter capacitor 252 connected between the conductor 251 and the common bus 164. The diode 250 and capacitor 252 serve as a direct current power supply for the switching circuit 230 and for other elements, to be described shortly, of the device 10. The other of the second pair 235 of contacts is connected to a power supply bus 254 which is, therefore, energized with a rectified voltage through the conductor 251 when the second pair 235 of contacts are closed due to energization of the coil 236.

A voltage dropping resistor 256 is connected between the power bus 254 and the terminal 237 of the coil 236. This terminal 237 of the coil is interconnected to the other terminal 238 of the coil by a diode 257. The diode 257 is connected for positive current flow in a direction from the terminal 238 toward the terminal 237 and serves to suppress transient voltages across the coil 236. The switching circuit 230 is provided with an input conductor 258 which interconnects the terminal 237 with the signal terminal 222.

The switching circuit 230 includes a switching transistor 260 of the NPN type having a collector 261, an emitter 262, and a base 263. The collector 261 is connected to the terminal 238 of the coil 236, and the emitter 262 is connected to the common bus 164. This switching circuit has three resistors 264, 265, and 266 connected sequentially between the power bus 254 and the common bus 164. The base 263 of the switching transistor 260 is connected between the resistors 265 and 266 so that the three resistors 264, 265, and 266 serve as a biasing and current-limiting network for the base 263. The switching circuit 230 includes a silicon-controlled rectifier, or SCR, 272 having an anode 273 connected between the resistors 264 and 265, having a cathode 274 directly connected to the common bus 164, and having a gate which defines a trigger terminal 276 for the switching circuit 230.

The device 10 has a timing circuit identified generally by the numeral 280. This circuit includes a conductor 282, which is interconnected by a current-limiting resistor 283 to the power bus 254 of the switching circuit 230, for energization of the timing circuit 280 from the bus 254 through the resistor 283 and the conductors 282. The conductor 282 is also connected to the common bus 164 by a zener diode 284 and by a capacitor 285 which are connected in parallel and, respectively, regulate and filter the voltage supplied to the conductor 282 from the power bus 254. The timing circuit 280 includes a unijunction transistor 286 having a pair of opposite base terminals 287 and 288 and an emitter 289. The base terminal 287 is connected by a load resistor 292 to the conductor 282, while the base terminal 288 is connected by a coupling resistor 293 to the trigger terminal 276 of the switching circuit 230. The base terminal 288 is also connected, by an output resistor 294, to the common bus 164. The timing circuit 280 includes a timing resistor 296 connected between the conductor 282 and the emitter 289 of the unijunction transistor 286 and includes a timing capacitor 298 connected between this emitter 289 and the common bus 164.

When the conductor 282 is first energized from the bus 254, as is well known in timing circuits utilizing a unijunction transistor such as the transistor 286, the transistor does not conduct so that the base terminal 288, which is connected to the resistors 293 and 294, is de-energized. However, as the timing capacitor 298 charges through the timing resistor 296, the voltage across the capacitor 298 increases. This voltage is applied to the emitter 289, and, when a predetermined voltage is attained, the transistor 286 conducts, discharging the timing capacitor 298 in a relatively short time to the common bus 164 through the output resistor 294 so that a voltage pulse is provided at the trigger terminal 276. Before the unijunction transistor 286 conducts, the trigger terminal is essentially at the voltage of the common bus 164 during a predetermined period of time required to charge the timing capacitor 298 through the timing resistor 296. This period of time commences when the timing circuit is first energized from the bus 254. The presence of the common bus voltage at the trigger terminal 276 after the timing circuit 280 is energized defines a third or override signal within the device 10. This signal is present for the predetermined period of time established by the resistance of the timing resistor 296 and the capacitance of the timing capacitor 298. The predetermined period is adjustable in a well-known manner by varying this resistance and/or this capacitance, an increase in either of these parameters lengthening the predetermined period and a decrease in either of these parameters shortening the predetermined period. Typically, these parameters are selected so that the predetermined period is approximately one hour.

Typical specifications for the various electrical and electronic elements utilized in the device 10 are given in the following table:

| Element | Description | Specification |
|---|---|---|
| 170 | relay | 24 VAC |
| 204 | diode | IN4003 |
| 205 | resistor | 22K, ¼w |
| 207 | capacitor | 10 mfd, 50 VDC |
| 208 | resistor | 22K, ¼w |
| 212 | diode | IN4003 |
| 213 | capacitor | 10 mfd, 50 VDC |
| 214 | resistor | 3.3K, ¼w |
| 216 | capacitor | 10 mfd, 50 VDC |
| 218 | transistor | 2N3906 |
| 250 | relay | 12 VDC |
| 252 | capacitor | 10 mfd, 50 VDC |
| 256 | resistor | 560, ¼w |
| 257 | diode | 1N4003 |
| 260 | transistor | 2N3904 |
| 264 | resistor | 10K, ¼w |
| 265 | resistor | 10K, ¼w |
| 266 | resistor | 10K, ¼w |
| 272 | silicon controlled rectifier | 2N5061 |
| 283 | resistor | 3K, ¼w |
| 284 | zener diode | 1N4748 |
| 285 | capacitor | 10 mfd, 50 VDC |
| 286 | unijunction transistor | 2N4891 |
| 292 | resistor | 1.8K, ¼w |
| 293 | resistor | 22K, ¼w |
| 294 | resistor | 120, ¼w |
| 296 | resistor | suitable |
| 298 | capacitor | suitable |

OPERATION

The operation of the described embodiment of the present invention is believed to be clearly apparent and is briefly summarized at this point.

For descriptive purposes, it is assumed that the switch 80 is in its second condition with the bar 89 closing the contacts 88 so that the system 28 is operating in its cooling mode. It is also assumed that the switch 102 is in its second position in which the bar 109 engages the terminal 108 so that the fan apparatus 50 operates only when the cooling terminal 94 is energized by closure of the cooling switch 74. It is further assumed that the time of day is such that the time clock 64 has closed the contacts 62 with the result that the coil 176 of the relay 170 is energized. The contacts 172, 173, and 174 are, therefore, closed so that the thermostat 32 is connected to the unit 30 by the conductors 40, 41, and 42, as well as by the conductor 43. The system, therefore, operates as if the device 10 and the time switch 34 were not present. That is, the cooling apparatus 54 and the fan apparatus 50 operate when, and only when, the cooling switch 74 is closed by the temperature sensor 76. However, when the time becomes such that the contacts 62 open, the coil 176 de-energizes and the contacts 172, 173, and 174 open. The relay coils 131, 132, and 133 cannot then be energized even though the corresponding terminals 92, 94, and 100 of the thermostat 32 are energized. As a result, operation of the unit 30 in any mode is inhibited, thereby saving energy.

When operation of the unit 30 is inhibited by opening of the contacts 172, 173, and 174 as just described, a person in the room 22 desiring to override the time switch 34 and return the unit to operation first manipulates the toggle 82, FIG. 2, to place the system mode select switch 80, FIG. 3A, to its first or center-off condition in which the bars 87 and 89 do not engage their respective contacts 86 and 88. With the switch 80 so positioned, the cooling circuit 184 is interrupted and the cooling terminal 94 of the thermostat 32, the conductor 41, and the terminal 141 of the device 10 are de-energized so that the first sensor circuit 200 provides the above-described permissive signal at the signal terminal 202 so that the transistor 218 conducts and the initiate signal occurs to energize the relay coil 276 and the transistor 260 in a manner hereinafter described. Under the circumstances assumed in which the fan mode switch 102 is in its second position with the bar 109 engaging the contact 108, the fan terminal 100, the fan conductor 42, and the terminal 142 of the device are also de-energized.

The switch 102 is next moved to its first position, in which the bar 109 engages the contact 107 which is, in turn, continuously energized through the power terminal 70. The fan terminal 100 is thus energized and the terminal 142 of the device 10 is energized through the fan conductor 42 from the fan terminal 100. The state of energization of the terminals 100 and 142 has, therefore, changed from a de-energized state to an energized state. It should be apparent that such changes in the state of energization necessarily occur when the fan mode switch 102 is cycled from either one of its positions to its other position and then back to the one position when the switch 102 is in its center-off position. When the terminal 142 of the device becomes energized by cycling of the switch 102, the previously described voltage pulse or initiate signal is emitted at the signal terminal 222 of the circuit 210 because the permissive signal is simultaneously present at the terminal 202, as described in the previous paragraph.

If, however, the fan terminal 100 of the thermostat 32 becomes energized when the terminal 142 is energized, the pulse representing the initiate signal is not emitted at the terminal 222 because the terminal 202 is energized from the cooling terminal 94 through the conductor 41, the diode 204, and the resistor 205 so that the transistor 218 is turned off. The initiate signal is also not emitted when the cooling terminal 94 and the fan terminal 100 become energized simultaneously because the terminal 202 becomes energized and the transistor 218 is turned off before the capacitor 213 charges sufficiently from the terminal 100 to generate the pulse representing the initiate signal. Such simultaneous energization occurs in the course of normal operation of the system 28 at a time when the temperature sensor 76 closes the cooling switch 74 and the system mode select switch 80 is disposed in its second condition, wherein the bar 89 closes the contacts 88, while the fan mode select switch 102 is disposed in its second position, wherein the bar 109 engages the contact 108. It is, therefore, apparent that the initiate signal is inhibited or "locked out" whenever the system mode select switch 80 is in its second condition, which corresponds to the cooling mode of the system 28, so that the permissive signal is not present.

The pulse, which is due to charging of the capacitor 216 and represents the initiate signal, energizes the terminal 237, FIG. 3B, of the relay 232 through the input conductor 258. The pulse simultaneously energizes the base 263 of the switching transistor 260 from the terminal 237 through the resistors 256, 264, and 265, so that the switching transistor 260, FIG. 3B, is turned on, connecting the terminal 238 to the bus 164. As a result, the relay coil 236 becomes energized, closing the first pair 234 of contacts and the second pair 235 of contacts. Closing of the second pair 235 connects the bus 254 to the conductor 162 through the diode 250. As a result, the relay coil 236 and the switching transistor 260 remain energized through the resistor 256 from the bus 254 after the pulse has terminated. The second pair 235 of contacts thus remain closed, "latching in" the coil 236 and the transistor 260 which are initially energized by the pulse. Closure of the first pair 234 bypasses the contacts 62, which are assumed to be open, and energizes the coil 176, FIG. 3A, of the relay 170. The contacts 172, 173, and 174 of the relay 170 are thereby closed so that operation of the unit 30 is no longer inhibited although the contacts 62 of the time switch 34 are open.

Energization of the power bus 254, FIG. 3B, as described in the previous paragraph, also initiates charging of the timing capacitor 298 through the timing resistor 296 and, as previously described, defines the beginning of the predetermined period of time for which the override signal, the voltage of the common bus 164, is present at the trigger terminal 276. It is apparent that, in the sequence described, operation of the timing circuit 280 to begin charging the timing capacitor 298 was initiated when the fan mode switch 102, FIG. 3A, was moved to its first position, wherein the bar 109 engages the contact 107, and that this charging was initiated because of the connection of the timing circuit 280 through the input conductor 258, FIGS. 3A and 3B, and the power bus 254 to the sensor circuits 200 and 210. It is also apparent that the predetermined period of time required to charge the timing capacitor 298, during which period the override signal is present, commenced when the permissive signal and the initiate signal were present simultaneously.

During the predetermined period of time, the relay 232 and the transistor 260 continue to be energized from the bus 254, so that the pair 234 of contacts remain closed and the terminals 60 of the time switch 34 remain connected electrically through the pair 234 of contacts and the conductors 45 and 46. When the pair 234 of contacts are closed, the coil 176 is energized through the conductors 179 and 242 so that the contacts 172, 173, and 174 of the relay 170 remain closed. As a result, operation of the unit 30 is not inhibited by the time switch 34 during the predetermined period, even though it is a time when operation of the unit 30 is usually not desired and the contacts 62 of the time switch 34 have been opened by the clock 64.

When the predetermined period of time expires, the timing circuit 280 provides the previously described pulse, due to discharge of the timing capacitor 298 through the unijunction transistor 286 and the resistor 294, to the trigger terminal 276 which is the gate of the SCR 272. The SCR is thereby turned on and, in effect, shorts the base 263 of the switching transistor 260 to the common bus 164 so that the switching transistor 260 is turned off. Flow of current through the coil 236 of the relay 232 is thus blocked so that the first pair 234 and the second pair 235 of contacts open. Opening of the second pair 235 disconnects the bus 254 from the conductor 162. The relay 232 thus remains de-energized and its pairs 234 and 235 of contacts remain open after the pulse at the trigger terminal 276 from the timing circuit 280 has dissipated. When the first pair 234 of contacts open, the time switch 34 is no longer bypassed by the pair 234 of contacts, and the state of energization of the coil 176 depends only on whether or not the contacts 62 of the time switch 34 are closed by the clock 64. Control of the system 28 to inhibit its operation for energy-saving purposes is thereby returned to the time switch.

If at the expiration of a predetermined period of time, as established by the timing resistor 296 and timing capacitor 298, operation of the system 28 is desired although such operation remains inhibited by the time switch 34, the system mode select switch 80 is again placed in its center-off condition and the fan mode select switch 102 is cycled between its first position and its second position, as before described, to initiate a subsequent predetermined period of time during which the device 10 of the present invention overrides the time switch 34.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. In combination with an air conditioning system characterized by a cyclically operable air conditioner unit and control means for controlling the operation of the unit including a thermostat remotely related to the unit and having a power supply circuit including a lead connecting the thermostat to the unit, a relay-actuated switch interposed in said lead adapted to close for facilitating application of power to said unit, a temperature responsive power supply switch connected with a normal operational source of power adapted to close for applying power to said lead, and timing means having a discontinuous mode of operation for periodically energizing said relay to close said relay-actuated switch for facilitating application of power to said unit, whereby a cycle of operation for said unit is facilitated, said power supply switch being adapted to close in response to temperature changes for applying operational power through said lead to said unit when said relay-actuated switch is closed for imposing a cycle of operation on said unit, timing means override apparatus mounted adjacent to said unit and interconnected with said lead of the power supply circuit and adapted to facilitate a cycle of operation for said unit in response to an opening and closing of said power supply switch.

2. A timing means override apparatus as defined in claim 1 wherein the override apparatus is operational during periods in which the operation of said timing means is discontinued, and includes means for applying power through said lead to said unit for a determinable period of timing means override in response to a momentary opening of the power supply switch.

3. A timing means override apparatus as defined in claim 2 wherein the override apparatus is retrofitted to said unit and interposed in the power supply circuit and whereby the power supply lead is completed from the thermostat to the unit through the apparatus for applying operational power to the unit.

4. An air conditioning system comprising:
A. an air conditioning unit having a plurality of modes of operation;
B. a control voltage source;
C. a thermostat remote from the unit having a mode switch manually actuatable between a first position in which a predetermined mode is selected and a second position, and a temperature-actuated switch which closes at a first predetermined temperature and opens at a second predetermined temperature;
D. conductors defining a first circuit including the voltage source, the unit and the mode switch, and a second circuit including the voltage source, the unit, and the temperature-actuated switch;
E. time switch means connected in the second circuit for opening said second circuit at a predetermined time so as to inhibit operation of the unit although the temperature-actuated switch is closed and for closing said circuit at another predetermined time, said means including a pair of terminals which are disconnected to interrupt said circuit and are connected to complete said circuit; and
F. a device for overriding the time switch means including
(1) switching means connected in parallel with said pair of terminals,
(2) timer means operable for closing said switching means for a predetermined period of time so that operation of the unit is not inhibited by the time switch means during said period and for opening said switching means at the expiration of said period, and,
(3) means connected to said first circuit for detecting movement of the mode switch from a predetermined one of said positions thereof and, thereupon, initiating operation of the timer means.

5. The system of claim 4 wherein the thermostat is characterized by another mode switch which is connected in the second circuit in series with the temperature-actuated switch and has a first condition, in which operation of the unit is inhibited when the temperature-actuated switch is closed, and a second condition, said device also including means connected to said second circuit for detecting said second condition of said other mode switch and for inhibiting operation of the timer means when the second position of said other mode switch is detected.

6. The system of claim 4 wherein the thermostat has a terminal connected in said first circuit so that said terminal is energized from the source when the mode switch is in the first position thereof and is de-energizable when said switch is in the second position thereof; the unit has a terminal which is energized to select said predetermined mode; and the first circuit includes a conductor connecting the thermostat terminal and the unit terminal so that the unit terminal is energizable from the thermostat terminal when the thermostat terminal is energized and is de-energized when the thermostat terminal is de-energized, and wherein the means for detecting movement of the mode switch from said one position is connected to said conductor at a point thereon adjacent to the unit terminal and said means detects said movement by detecting a change in the state of energization of the thermostat terminal.

7. A device for overriding selectively a time switch of an air conditioner system which includes:
a source of control voltage;
an air conditioner unit having
an apparatus terminal,
air conditioning apparatus connected between the apparatus terminal and the common terminal so as to operate when the apparatus terminal is energized from the source,
a fan terminal, and
a fan connected between the fan terminal and the common terminal so as to operate when the fan terminal is energized from the source;
a thermostat disposed remotely from the unit and having a power terminal adapted for energization from the source,
an output terminal,
a fan terminal,
a temperature-actuated switch connected between the power terminal and the output terminal, the temperature-actuated switch closing at a predetermined ambient temperature where operation of the apparatus is desired and opening at a predetermined ambient temperature where said operation is desired to terminate,
a manually actuated fan mode switch connected between the power terminal and said fan terminal, the fan mode switch having a first position wherein said switch provides a direct connection between said terminals for energization of said fan terminal from the power terminal and a second position wherein said switch interrupts said direct connection so that said fan terminal is de-energizable and
a manually actuated system mode select switch connected in series with the temperature-actuated switch between the power terminal and the output terminal, the system mode select switch having a closed condition wherein said output terminal is energizable from the power terminal through said switch when the temperature-actuated switch is closed and having an open condition wherein said switch interrupts connection between said terminals so that said output terminal is de-energized;
a time switch having
a pair of terminals,
an open position wherein said pair of terminals are disconnected through said switch, and
a closed position wherein said pair of terminals are connected through said switch, the time switch assuming the closed position during predetermined times when operation of the apparatus is desired and assuming the open position during other predetermined times when such operation is usually not desired;
a control conductor connecting said apparatus terminal and said output terminal so that the apparatus terminal is de-energized when the output terminal is de-energized and so that the apparatus terminal is energizable through said conductor from said output terminal; and
a fan conductor connecting the unit fan terminal and the thermostat fan terminal so that the unit fan terminal is de-energized when the thermostat fan terminal is in a de-energized state and is energizable through the fan conductor when the thermostat fan terminal is in an energized state, said device being located adjacent to the unit and adapted to override the time switch by selective actuation of the fan mode switch and of the system mode select switch and comprising:

A. first sensing means connected to the control conductor for providing a first signal when the output terminal is de-energized, as when the system mode select switch is in the open condition thereof;

B. second sensing means connected to the fan conductor for providing a second signal when the thermostat fan terminal changes from a predetermined one of said states to the other of said states, as when the fan mode switch is cycled from one of said positions thereof to the other of said positions thereof and back to said one position;

C. timer means connected to said first sensing means and to said second sensing means for providing a third signal for a predetermined period of time, said period commencing whenever said first signal and said second signal are present simultaneously; and D. switching means connected in parallel with said pair of terminals of the time switch and connected to the timer means for connecting said pair of terminals while said third signal is present although the time switch is in the open position thereof, as during said predetermined times when operation of the cooling apparatus is usually not desired.

8. A device for selectively overriding an air conditioner time switch of an air conditioner system which includes:

a source of control voltage having a live terminal and a common terminal;

an air conditioner unit having
 a cooling terminal,
 cooling apparatus connected between the cooling terminal and the common terminal so as to operate when the cooling terminal is energized from the live terminal,
 a fan terminal, and
 fan apparatus connected between the fan terminal and the common terminal so as to operate when the fan terminal is energized from the live terminal;

a thermostat disposed remotely from the unit and having
 a power terminal adapted for energization from the live terminal,
 a cooling terminal,
 a fan terminal,
 a temperature-actuated switch connected between the power terminal and said cooling terminal, the temperature-actuated switch closing at a predetermined ambient temperature where operation of the cooling apparatus is desired and opening at a predetermined ambient temperature where said operation is desired to terminate,
 a manually actuated fan mode switch connected between the power terminal and said fan terminal, the fan mode switch having a first position wherein said switch provides a direct connection between said terminals for energization of said fan terminal from the power terminal and a second position wherein said switch interrupts said direct connection so that said fan terminal is de-energizable, and
 a manually actuated system mode select switch connected in series with the temperature-actuated switch between the power terminal and said cooling terminal, the system mode select switch having a closed condition wherein said cooling terminal is energizable from the power terminal through said switch when the temperature-actuated switch is closed and having an open condition wherein said switch interrupts connection between said terminals so that said cooling terminal is de-energized;

a time switch having
 a pair of terminals,
 an open position wherein said pair of terminals is disconnected through said switch, and
 a closed position wherein said pair of terminals is connected through said switch, the time switch assuming the closed position during predetermined times when operation of the cooling apparatus is desired and assuming the open position during other predetermined times when such operation is usually not desired;

a cooling conductor connecting the unit cooling terminal and the thermostat cooling terminal so that the unit cooling terminal is de-energized when the thermostat cooling terminal is de-energized and so that the unit cooling terminal is energizable through the cooling conductor from the thermostat cooling terminal when the the thermostat cooling terminal is energized;

a fan conductor connecting the unit fan terminal and the thermostat fan terminal so that the unit fan terminal is de-energized when the thermostat fan terminal is in a de-energized state and so that the unit fan terminal is energizable through the fan conductor when the thermostat fan terminal is in an energized state; and a power conductor connecting the live terminal and the power terminal, said device being located adjacent to the unit and adapted to override the time switch by selective actuation of the fan mode switch and of the system mode select switch and comprising:

A. first sensing means connected between the cooling conductor and the common terminal for providing a first signal when the thermostat cooling terminal is de-energized, as when the system mode select switch is in the open position thereof;

B. second sensing means connected between the fan conductor and the common terminal for providing a second signal when the thermostat fan terminal changes from a predetermined one of said states to the other of said states, as when the fan mode switch is cycled from one of said positions thereof to the other of said positions thereof and back to said one position;

C. timer means connected to said first sensing means and to said second sensing means for providing a third signal for a predetermined period of time, said period commencing whenever said first signal and said second signal are present simultaneously;

D. first switching means connected in parallel with said pair of terminals of the time switch and connected to the timer means for connecting said pair of terminals while said third signal is present although the time switch is in the open position thereof, as during said predetermined times when operation of the cooling apparatus is usually not desired; and E. second switching means connected between the live terminal and the common terminal in series with said pair of terminals of the time switch so that the second switching means is energized from the source when said pair of terminals is connected and is de-energized when said pair of terminals is disconnected, the second switching means having a pair of contacts connected in the cooling conductor and in series between the thermostat cooling terminal and the unit cooling terminal, said pair of contacts closing when the second switching means is energized through said pair of terminals of the time switch so that the unit cooling terminal is energized through said conductor for operation of the cooling apparatus when the thermostat cooling terminal is energized, and said pair of contacts opening when the second switching means is de-energized so that the unit cooling terminal is disconnected from the thermostat cooling terminal and is de-energized although the thermostat cooling terminal is energized.

* * * * *